July 12, 1960
C. F. SPADEMAN
2,944,808
AUXILIARY LOAD MECHANISM FOR WEIGHING SCALES
Filed May 18, 1956
5 Sheets-Sheet 3
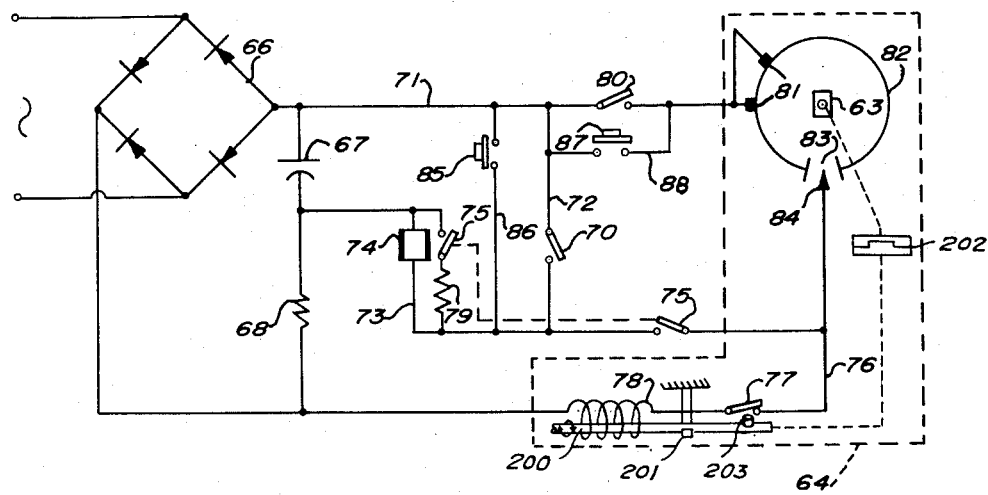
Fig. III
Fig. IV
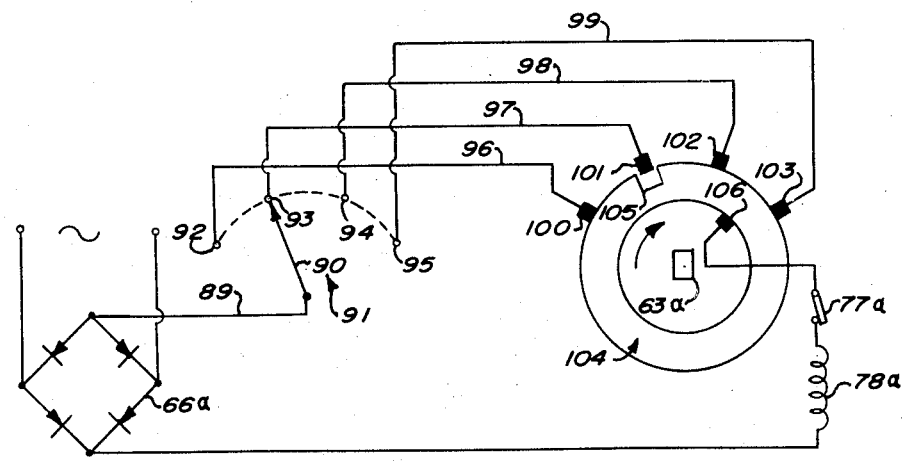
INVENTOR.
CHARLES F. SPADEMAN
BY
Marshall, Marshall & Yeasting
ATTORNEYS July 12, 1960  C. F. SPADEMAN  2,944,808
AUXILIARY LOAD MECHANISM FOR WEIGHING SCALES
Filed May 18, 1956  5 Sheets-Sheet 4
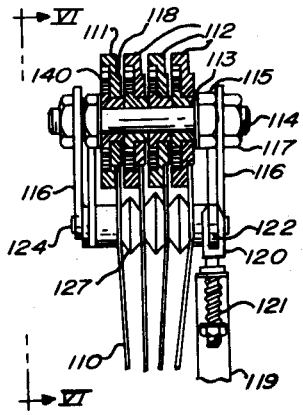
Fig. V
Fig. VI
Fig. VII
INVENTOR.
CHARLES F. SPADEMAN
BY
ATTORNEYS

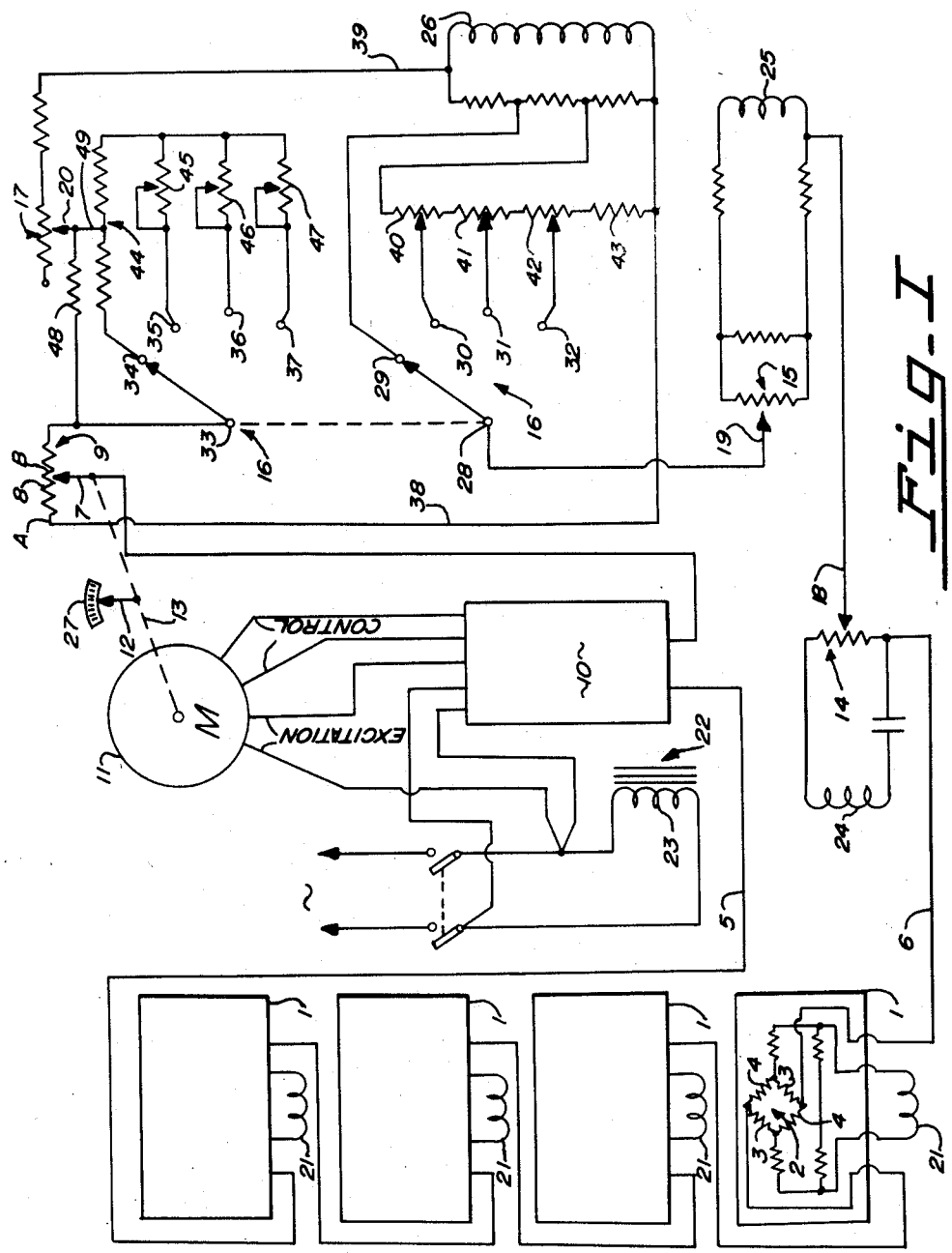
July 12, 1960  C. F. SPADEMAN  2,944,808
AUXILIARY LOAD MECHANISM FOR WEIGHING SCALES
Filed May 18, 1956  5 Sheets-Sheet 1
Fig. I
INVENTOR.
CHARLES F. SPADEMAN
BY
Marshall, Marshall & Yeasting
ATTORNEYS

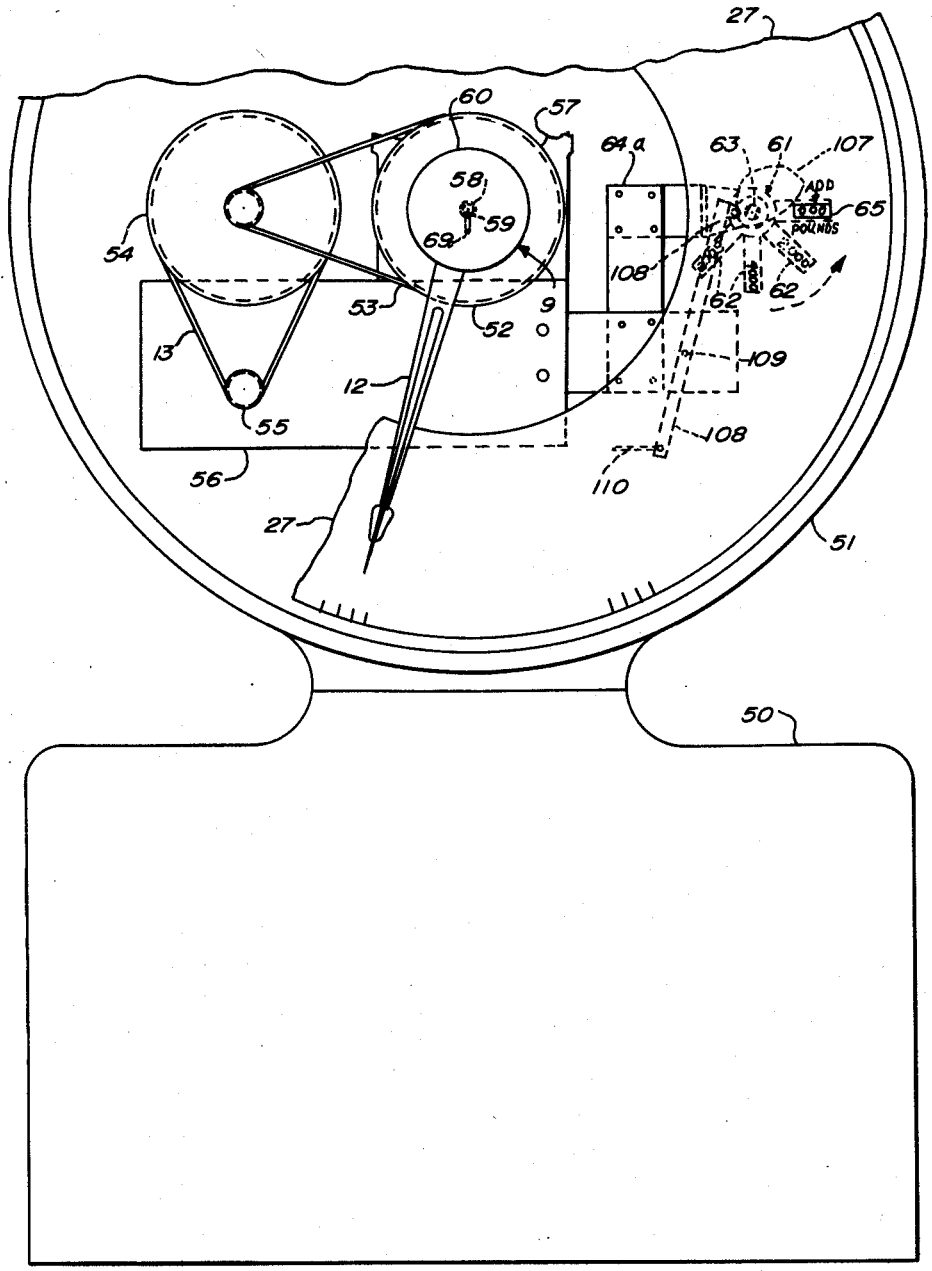
Fig. II
INVENTOR.
CHARLES F. SPADEMAN

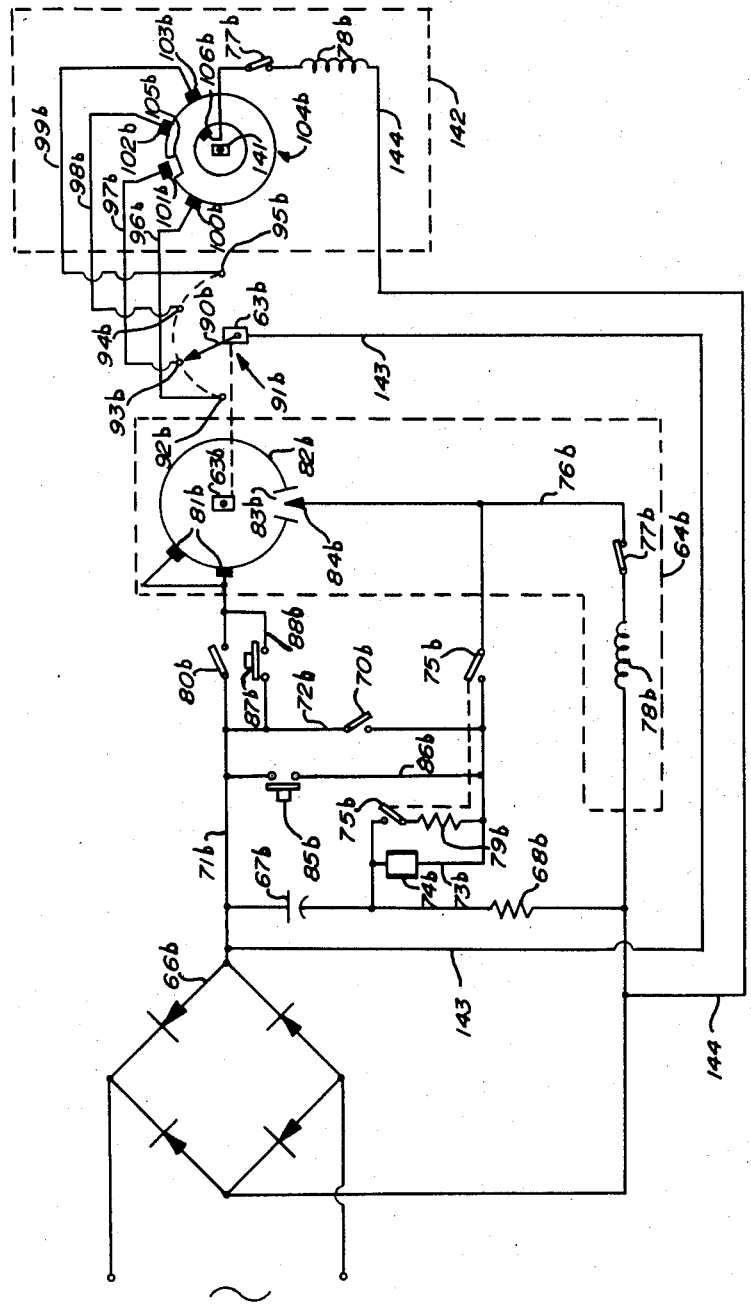

United States Patent Office 2,944,808
Patented July 12, 1960

2,944,808

AUXILIARY LOAD MECHANISM FOR WEIGHING SCALES

Charles F. Spademan, Toledo, Ohio, assignor, by mesne assignments, to Toledo Scale Corporation, Toledo, Ohio, a corporation of Ohio Filed May 18, 1956, Ser. No. 585,820

2 Claims. (Cl. 265—5)

This invention relates to strain gage load cell weighing scales and in particular to auxiliary load mechanism for selectively increasing the capacity of such scales.

The auxiliary load mechanism is especially suitable for use with a load cell weighing scale of the type which includes a network having an output voltage which is a function of load applied to the weighing scale and a continuously automatically adjustable voltage source that supplies a second voltage in opposition to the output voltage of the network and that operates in response to differences between the voltages. The load counter-balancing capacity of the weighing scale is so selected that suitable sensitivity of indication is given by its indicator and such capacity must be increased, when very heavy loads are weighed, without decreasing such sensitivity of indication. When the capacity of the scale is changed, suitable signals must be given to indicate the current capacity of the scale.

The principal object of this invention is to provide, in an electronic weighing scale, automatic means for increasing the capacity of the weighing scale without decreasing the sensitivity of indication given by its indicator and remote signals, operated in conjunction with said means, for indicating the current capacity of the scale.

Another object of the invention is to provide, in an electronic weighing scale, improved manually operable and automatic auxiliary load mechanisms to increase the capacity of the scale and improved auxiliary load indicating mechanism for indicating such increased capacity.

A further object of the invention is to provide auxiliary load printing mechanism which is operated along with the auxiliary load and auxiliary load indicating mechanisms.

Still another object of the invention is to provide, in a strain gage load cell weighing scale, means including an electrical circuit for automatically increasing the capacity of the weighing scale in delayed steps and for automatically and rapidly changing said increased capacity back to the initial capacity when load is removed from the scale.

Other objects and advantages are apparent from the following description of preferred forms of the invention.

According to the invention, improved auxiliary load mechanism and improved auxiliary load indicating mechanism are provided for an electronic weighing scale which comprises a load cell, a balanceable network that includes an electrical strain gage operatively connected to the load cell and that is adapted to be unbalanced in response to changes in load applied to the load cell, and a circuit that is connected to the network and that includes a feedback potentiometer having a constant resistance and a sliding contact and means for automatically varying the position of the sliding contact relative to the constant resistance to vary the output voltage of the circuit in accordance with the output voltage of the network, the output voltage of the network being in opposition to the output voltage of the circuit. The auxiliary load mechanism includes means, which may be automatic, for adding at least one fixed increment of voltage to the output voltage of the circuit to increase the capacity of the weighing scale. Suitable remote visual and/or printed signals indicate the fixed increment of voltage added to the output voltage of the circuit in terms of weight.

Preferred embodiments of the invention are illustrated in the accompanying drawings. In the drawings:

Figure I is a schematic wiring diagram showing the essential components of an electronic weighing scale.

Figure II is a front elevational view of the cabinet and part of the dial housing of the weighing scale.

Figure III is a schematic wiring diagram showing means including an electrical circuit for automatically or manually operating the double deck selector switch illustrated in Figure I and the auxiliary load indicating mechanism shown in Figure II.

Figure IV is a schematic wiring diagram showing means including an electrical circuit which is manually controlled for operating the double deck selector switch illustrated in Figure I and the auxiliary load indicating mechanism shown in Figure II.

Figure V is a vertical sectional view of auxiliary load printing mechanism.

Figure VI is an elevational view as seen from the line VI—VI of Figure V looking in the direction indicated by the arrows.

Figure VII is an enlarged elevational detail view of part of the mechanism shown in Figure VI.

Figure VIII is a schematic wiring diagram showing the electrical circuits illustrated in Figures III and IV combined to provide isolation between the signal and power circuits to reduce pickup or noise in the signal circuit.

These specific figures and the accompanying description are intended to merely illustrate the invention and not to impose limitations on the claims.

Referring to Figure I, an electronic weighing scale embodying the invention includes four load cells 1 connected in series and each comprising a resistance wire strain gage bridge 2, only one of which is shown, having resistance elements 3 in two of its legs and resistance elements 4 in the other two legs. The bridges 2 are of an ordinary type used in gages available for measuring strain wherein the elements 3 and 4 are adapted to change in resistance with changes in a condition to be measured, e.g., load applied to the load cells 1. It is to be appreciated, however, that other forms of electrical translators which produce electrical signals that are functions of the loads applied to the load cells 1 may be used in place of the bridges 2.

In order that measurements of load applied to the load cells 1 may be obtained, there are provided conductors 5 and 6 from the output terminals of the series-connected bridges 2 to a sliding contact 7 and to a constant resistance 8 respectively of a feedback potentiometer 9. An amplifier and motor control device 10 is connected in circuit with the conductor 5 and controls the operation of a motor 11 which both positions an indicator 12 and the sliding contact 7 of the potentiometer 9 through a belt 13. A quadrature adjust potentiometer 14, a zero adjust potentiometer 15, a double deck selector switch 16, and a span adjust resistance 17 are connected in the order named in circuit with the conductor 6. The potentiometers 14 and 15 and the resistance 17 have sliding contacts 18, 19 and 20 respectively which are adapted to be positioned manually.

The strain gage bridges 2 are supplied with alternating current from the secondary windings 21 of a power transformer 22 that has its primary windings 23 connected to a source of alternating current. The quadrature adjust potentiometer 14 and the zero adjust potentiometer 15 are energized by secondary windings 24 and 25 respectively of the transformer 22 and the feedback potentiometer 9 is energized by the secondary windings 26 of the transformer 22, the windings 26 being connected with the adjustable resistance 17 across the feedback potentiometer 9.

The series-connected bridges 2 form a balanceable network that is adapted to be unbalanced in response to changes in load applied to the load cells 1, i.e., the network develops an output voltage between the conductors 5 and 6 which is a function of load applied to the load cells. This output voltage opposes the output voltage of the feedback potentiometer 9, the potentiometer 9 driven by the motor 11 serving as a continuously automatically adjustable voltage source. The output voltage of the bridge network opposes the output of the feedback potentiometer circuit connected thereto to determine the flow of current through the amplifier and motor control device 10. An unbalance of the output voltages results in operation of the motor 11 to position the indicator 12 and the contact 7 until the opposing voltages are equal whereby input voltage to the amplifier 10 is restored to null, i.e., the change in output voltage from stationary point A to positionable point B on the feedback potentiometer 9 effectively cancels out the voltage change from the load cells 1 as load changes upon the load cells. An adjustment of the contact 19 of the potentiometer 15 results in a change in the positions of contact 7 to produce a balance for predetermined conditions to be measured. The positions of contact 7 are representative of the conditions measured, and a changing of these positions by adjustment of contact 19 merely results in an indication of the values from a different zero point, i.e., the zero adjust potentiometer 15 functions to adjust the weighing scale indicator 12 to zero indication on an indicia bearing chart 27 when no load is upon the load cells 1. The potentiometer 14, which is in circuit with the potentiometer 15, functions to adjust the quadrature voltage to a level which will not affect gain of the amplifier 10, i.e., saturate the amplifier. The span adjust resistance 17 functions to adjust the voltage across the potentiometer 9 so that the change in voltage between the points A and B on the potentiometer as the contact 7 is moved and the indicator 12 is moved therewith from a zero designation on the chart 27 to full chart capacity is equal and opposite to the change in load cell output voltage (sum of the four cells 1) obtained by placing a weight equal to chart capacity upon the load cells.

When the selector switch 16, which comprises a first deck 28 having four terminals or contacts 29, 30, 31 and 32 and a second deck 33 having four terminals or contacts 34, 35, 36 and 37, is in the position shown in Figure I and when the zero adjust potentiometer 15 and the span adjust resistance 17 are properly adjusted, the weight of any load that is placed upon the load cells 1 and that is within the capacity of the chart 27 is indicated by the indicator 12 on the chart. Such capacity is so chosen that suitable sensitivity of indication is given. When very heavy loads are weighed, the capacity of the weighing scale may be increased without decreasing the sensitivity of indication by means of the selector switch 16 and the circuit associated therewith.

The decks 28 and 33 of the selector switch 16 move as a unit and when contacts 29 and 34 of the switch are closed, as shown in Figure I, the feedback potentiometer 9 is energized through conductors 38 and 39 by the secondary windings 26 to such a level that the output voltage of the potentiometer may exactly balance the output voltage of the bridges 2 for any load within the capacity of the chart 27. Contacts 30, 31 and 32 of the first deck 28 of the switch 16 are connected to variable resistances 40, 41 and 42 respectively which resistances are connected in turn along with a constant resistance 43 in parallel across the secondary windings 26 and in parallel across the feedback potentiometer 9. The variable resistances are adapted to be manually adjustable and their sliders are so positioned, as determined by trial, that the voltage between contacts 29 and 30, for example, is equal to the voltage change of the feedback potentiometer 9 from zero to full chart capacity. By turning the selector switch 16, the movable contact of which is in series with the potentiometers 14 and 15, to close contact 30 such additional fixed increment of voltage may be added to the output voltage of the feedback potentiometer 9 to change, e.g., to double, the capacity of the weighing scale. The resistances 40, 41 and 42 may be pictured as one resistance in parallel across the potentiometer 9 and the movable contact of the first deck 28 of the switch 16 as a slider contacting such resistance. Thus, with a load equal to chart capacity upon the load cells 1 and with the selector switch turned to close contact 30 the indicator 12 points to the zero indicium on the chart 27. Remote signals for indicating the fixed increment of voltage added by means of the selector switch 16 in terms of weight will be hereinafter described in detail. Similarly, the selector switch 16 may be turned to pick off fixed increments of voltage from contacts 31 or 32, the voltage added by closing contact 31 being larger than the one added by closing contact 30 and the voltage added by closing contact 32 being larger than the one added by closing contact 31. If it is desired, more contacts may be provided to supply even more fixed increments of voltage.

As shown in Figure I, the selector switch 16 may be used to pick off and add any one of three fixed increments of voltage to the output voltage of the potentiometer 9 to increase the capacity of the weighing scale for example, 1000 pounds capacity with contact 29 closed, to 2000 pounds capacity with contact 30 closed, to 3000 pounds capacity with contact 31 closed, or to 4000 pounds capacity with contact 32 closed or, for example, to increase the capacity of the weighing scale from 2000 pounds capacity with contact 29 closed, to 4000 pounds capacity with contact 30 closed, to 6000 pounds capacity with contact 31 closed, or to 8000 pounds capacity with contact 32 closed. Although it is usually desirable that the auxiliary load mechanism increase the capacity of the scale in steps each of which is equal to the capacity of the chart 27, steps of any suitable size may be chosen by the proper design of the circuit which comprises the resistances 40, 41, 42 and 43.

As hereinbefore described, the span adjust resistance 17 functions to adjust the voltage across the potentiometer 9 so that the change in voltage between the points A and B on the potentiometer as the contact 7 is moved and the indicator 12 is moved therewith from a zero designation on the chart 27 to full chart capacity is equal and opposite to the change in load cell output voltage (sum of the four cells 1) obtained by placing a weight equal to chart capacity upon the load cells. However, the load cell output voltage is not linear over the entire load cell range which may be utilized by increasing the capacity of the weighing scale beyond that of the chart 27. In a weighing scale, an error in linearity may be defined as a half capacity load indication which is not equal to the average of the zero and full capacity load indications. The second deck 33 of the selector switch 16 and the circuit associated therewith are used to adjust the span every time the capacity of the scale is changed, i.e., the second deck 33 functions to adjust the voltage across the feedback potentiometer 9 so that it always matches the load cell output voltage.

The contacts 34, 35, 36 and 37 of the second deck 33 of the selector switch 16 are connected to resistances 44, 45, 46 and 47 respectively which may be connected in parallel by the switch across a constant resistance 48 connected in series between the span adjust resistance 17 and the potentiometer 9. The decks 28 and 33 of the selector switch 16 move as a unit. When contacts 29 and 34 are closed, sliding contact 20 is used to adjust the span as hereinbefore described. When contacts 30 and 35 are closed, current is shunted around resistance 48 through a conductor 49 and through resistance 45. Similarly, when contacts 31 and 36 are closed and when contacts 32 and 37 are closed, current is shunted around resistance 48 through the conductor 49 and through resistances 46 and 47 respectively. Variable resistances 45, 46 and 47 are adapted to be manually adjustable and their sliders are so positioned, as determined by trial, that the span is automatically and correctly adjusted every time the capacity of the weighing scale is increased or reduced to compensate for the non-linearity in the load cell output over the load cell range.

Referring to Figure II, the electronic weighing scale further includes a cabinet 50 surmounted by a dial housing 51 within which is rotatably mounted the indicator 12 that cooperates with the chart 27. The chart 27, which is shown schematically in Figure I, is illustrated fragmentarily in Figure II. The indicator 12 is fixed to a sheave 52 which is turned by a belt 53 driven by a pulley 54 that is driven in turn from the drive shaft 55 of the motor 11 (Figure I). The motor 11 is shown schematically in Figure I as driving the indicator 12 and the contact 7 of the feedback potentiometer 9 through the belt 13. In the actual structure as show in Figure II, the belt 13 is driven by the drive shaft 55 of the motor 11 and is connected to the indicator 12 and the contact 7 of the potentiometer 9 through the pulley 54, belt 53 and sheave 52. Both the motor 11 and the pulley 54 are mounted on a vertical supporting plate 56 secured to an upstanding frame 57 within the dial housing 51. When an unbalance of output voltage results in operation of the motor 11 to position the contact 7 of the potentiometer 9, it is of course necessary that the indicator 12 be driven by the motor 11 to exactly the correct point on the chart 27. For this reason, the motor 11 is drivingly connected to a shaft 58, upon which the indicator 12 is mounted, and to a potentiometer shaft 59, which positions the contact 7, by means of the sheave 52 that is a common drive means for both of the shafts, the shafts being axially aligned and rigidly coupled so that they turn as one. As may be seen in Figure II, the entire feedback potentiometer structure 9 including its case 60 is supported adjacent to the indicator 12. The weight of any load within the capacity of the chart 27 that is placed upon the load cells 1 (Figure I) is indicated by the indicator 12 on the chart.

The weighing scale also includes auxiliary load indicating means or remote signals for indicating the increased capacity of the weighing scale as controlled by the selector switch 16. The auxiliary load indicating means comprises a unit weight chart plate 61 that has a plurality of radially extending indicia bearing fingers 62 and that is fixed on a drive shaft 63 of an ordinary stepping switch 64 (Figure III). The stepping switch 64 is suitably mounted on an L-shaped support 64a (Figure II) which is carried by the plate 56. The stepping switch 64 is of the type known as a "Ledex," but any other kind of stepping means may be substituted in place of the Ledex, the switch itself not being a part of the invention. A stepping switch of the Ledex type includes a first part which resembles an ordinary rotary solenoid wherein an armature shaft 200 (Fig. III) is turned through an angle of 40 to 50 degrees when a coil 78 is energized and is rocked by a return spring 201 to its initial position when the coil is deenergized and a second part which comprises a drive shaft 63 which is stepped around in one direction only by means of a clutch 202 operatively connecting it to the rockable armature shaft. Every time the coil of the Ledex is energized, the drive shaft is rotated one step ahead.

The indicia bearing fingers 62 of the unit weight chart plate 61 extend radially to a position within the field of view of an opening 65 in the chart 27 (Figure II), which may be provided with a magnifying lens, to give a visual indication of the increased capacity of the scale as controlled by the selector switch 16. Appropriate lettering adjacent the opening 65, e.g., Add-pounds, serves to call attention to the fact that the amount represented by the indicia within the field of view of the opening 65 must be added to the amount indicated by the indicator 12 on the chart 27. The drive shaft 63 of the stepping switch 64 not only positions the unit weight chart plate 61 but also the selector switch 16 (Figure I) which is suitably fixed to the drive shaft, the chart plate and the selector switch turning as a unit.

The stepping switch 64 may be automatically controlled by means of the electrical circuit shown in Figure III which includes a full wave rectifier 66 that is connected to a suitable source of alternating current and a condenser 67 that is connected across the rectifier. The condenser 67 is charged through a resistance 68 so that an appreciable time, e.g., two seconds, is required to charge it.

When the condenser 67 is charged and after a limit switch actuating finger 69 (Figure II) on the indicator shaft 58 closes an upper limit switch 70 (Figure III), which happens when the indicator 12 swings around to full dial capacity, current flows through a lead 71, a branch lead 72, the now closed switch 70, and a lead 73 to energize the coil of a relay 74. Energization of the coil of the relay 74 closes its normally open contacts 75 and current flows through a lead 76 and an interrupter switch 77 to energize the coil 78 of the stepping switch 64. At the same time, current also flows through a resistance 79 to short out the relay 74 and its contacts 75 open.

Energization of the coil 78 of the stepping switch 64 rocks its armature shaft which turns the drive shaft 63 one step ahead and also opens the interrupter switch 77 by means of an arm 203 on the armature shaft. Opening of the interrupter switch 77 deenergizes the coil 78 of the stepping switch 64 and the armature shaft is spring-returned to its initial position, the drive shaft 63, however, remaining in its stepped-ahead position.

The turning of the drive shaft 63 one step ahead rotates the selector switch 16, mounted on the shaft, to a position such that contacts 30 and 35 (Figure I) are closed and also rotates the indicia bearing unit weight chart plate 61 (Figure II), also mounted on the shaft, to a position such that the fixed increment of voltage added to the output voltage of the feedback potentiometer 9 by means of the selector switch 16 is visually indicated in terms of weight.

If the load upon the load cells 1 is greater than the capacity of the chart 27 plus the additional capacity provided by closing the contacts 30 and 35 of the selector switch 16, the finger 69 on the indicator shaft 58 continues to close the upper limit switch 70. In such a case, after the appreciable delay hereinbefore mentioned to charge the condenser 67, the cycle is repeated to advance the drive shaft 63 of the stepping switch 64 another step.

When all of the load or enough of the load is removed from the load cells 1 to cause the indicator 12 to point to the zero indicium on the chart 27, the finger 69 on the indicator shaft 58 closes a lower limit switch 80. Current then flows through the closed switch 80 and through a pair of brushes 81 which make constant contact with a circuit opening selector switch 82 that is mounted on the drive shaft 63 of the stepping switch 64 as is indicated in Figure III. When the capacity of the weighing scale is equal to the capacity of the chart 27, i.e., when the double deck selector switch 16 is positioned as shown in Figure I, the circuit opening contacts 83 of the circuit opening selector switch 82 are in the position shown in Figure III. However, in all other positions of the double deck selector switch 16 the corresponding positions of the circuit opening selector switch 82 is such that the contacts 83 of the switch 82 are positioned away from a terminal 84 and the circuit from the brushes 81 through the switch 82 to the terminal 84 is unbroken and current flows from the terminal 84 through the lead 76 and the interrupter switch 77 to energize the coil 78 of the stepping switch 64. Energization of the coil 78 of the stepping switch 64 causes the drive shaft 63 to be rapidly driven ahead to automatically reduce the capacity of the weighing scale according to the load upon the load cells 1. For example, if all of the load is removed from the load cells 1, the lower limit switch 80 is automatically held closed and the drive shaft 63 is rotated until the contacts 83 of the circuit opening selector switch 82 are in the position shown in Figure III to break the flow of current to the coil of the stepping switch 64. In such position of the drive shaft 63, the selector switch 16, fixed to the drive shaft, is in the position shown in Figure I and the unit weight chart plate 61, also fixed to the drive shaft, is in the position shown in Figure II.

One of the features of the circuit shown in Figure III is in the delay provided by the time needed to charge the condenser 67. Such delay causes the selector switch 16 to be rotated in delayed steps when the capacity of the scale is increased to give the limit switch actuating finger on the indicator shaft 58 time to back away from the upper limit switch 70 if the capacity of the scale has been increased sufficiently. This prevents the stepping switch 64 from automatically advancing the selector switch 16 too far. However, it is noted that when the increased capacity is changed back to or toward the original capacity there is no such delayed stepping action, current flowing continuously through the circuit opening selector switch 82 to energize the coil of the stepping switch 64 until the selector switch 16 is rapidly advanced to or toward its initial position.

The stepping switch 64 may be manually controlled by means of a step switch 85 in a lead 86 which is in parallel with the lead 72. Depression of the step switch 85 produces the same results as the automatic closing of the upper limit switch 70. Similarly, the stepping switch 64 may be manually controlled by means of a reset switch 87 in a lead 88 that may be used to shunt current around the lower limit switch 80. Depression of the reset switch 87 produces the same results as the automatic closing of the lower limit switch 80.

In operation, when the stepping switch 64 is so positioned that the contacts of the selector switch 16 are as shown in Figure I, the capacity of the weighing scale is equal to the capacity of the chart 27. In such position, the auxiliary load indicating mechanism, through the opening 65 in the chart 27, indicates that zero pounds are to be added to the amount indicated by the indicator 12 on the chart. When the stepping switch 64 drives the selector switch 16 to its next station so that contacts 30 and 35 (Figure I) are closed, the weighing scale capacity is increased by an amount which is indicated by the auxiliary load indicating mechanism through the opening 65 in the chart 27. If even more capacity is needed, the stepping switch drives the selector switch to its next station, etc.

A modification of the control circuit shown in Figure III is illustrated in Figure IV, similar reference numerals identifying parts which are similar in structure and in function. The circuit includes a full wave rectifier 66a that is connected to a suitable source of alternating current. Current flows from the rectifier through a lead 89 to a movable unit weight contact 90 of a switch 91. The movable contact 90 is adapted to be manually positionable and may be turned so that current flows from the contact 90 through any one of four terminals 92, 93, 94 and 95. The terminals 92, 93, 94 and 95 are connected by means of leads 96, 97, 98 and 99 respectively to brushes 100, 101, 102 and 103 respectively which brushes make constant contact with a selector switch 104 except when a notch 105 in the switch is located opposite to a brush. The selector switch 104 is mounted on the drive shaft 63a of a stepping switch which corresponds to the stepping switch 64 shown in Figure III and makes constant contact with a brush 106 connected in circuit with an interrupter switch 77a and a coil 78a of the stepping switch. The double deck selector switch 16 (Figure I) and the indicia bearing unit weight chart plate 61 (Figure II) also may be mounted on the drive shaft 63a to rotate as a unit.

In operation, when the movable unit weight contact 90 is turned to complete the circuit through the terminal 92, current flows through the lead 96, the brush 100, the switch 104, the brush 106, and the interrupter switch 77a to energize the coil 78a of the stepping switch. This causes the armature shaft of the stepping switch to step the drive shaft 63a of the stepping switch around in the direction indicated by the arrow in Figure IV until the notch 105 is located opposite to the brush 100 which opens the circuit. The selector switch 16 is then in the position shown in Figure I and the unit weight chart plate 61 is then in the position shown in Figure I, the capacity of the weighing scale being equal to that of the chart 27. When the movable contact 90 is turned from the terminal 92 to complete the circuit through the terminal 93, as shown in Figure IV, the coil 78a is energized long enough to step the switch 104 clockwise to its position shown in Figure IV. In such position, the notch 105 is opposite to the brush 101 and the circuit is broken. The stepping of the switch 104 and its drive shaft 63a rotates the selector switch 16 and the unit weight chart plate 61 as a unit to increase the capacity of the scale and to visually indicate such increased capacity. Similarly, the movable contact 91 may be turned to terminals 94 or 95 and the switch 104 and its drive shaft 63a will quickly assume corresponding positions.

Auxiliary load printing mechanism also may be operated along with the auxiliary load mechanism and the auxiliary load visual indicating mechanism. The printing mechanism includes a cam 107 (Figure II) mounted on the drive shaft 63 to turn as a unit with the chart plate 61 and a cam follower 108 which is suitably mounted to rock back and forth about a pivot point 109. The lower end of the cam follower actuates a cord 110 which may be connected to a unit weight type wheel 111 (Figures V and VI) to rotate the wheel to positions such that the amount of the increased capacity of the weighing scale as controlled by the stepping switch 64 will be set up on the wheel in printing position, i.e., the unit weight type wheel 111 may print, for example, the thousands figure of the weight indication. A plurality of adjacent type wheels 112 lie in parallel planes and are used to print the hundreds, tens and units of the weight indication adjacent said thousands indication.

The type wheels 111 and 112 are journaled on bushings 113, the bushings in turn being sleeved over an axle 114. The axle 114 is threaded at both ends to receive a pair of nuts 115 which act to clamp the bushings together on the axle. The bushings cannot rotate on the axle because of their being clamped by the nuts. Rotation of the type wheels is therefore around the bushings. A pair of arms 116 is engaged around the opposite ends of the axle 114 outside the nuts 115. The axle 114 is clamped with respect to the arms 116 by means of nuts 117 on the outer ends of the axle.

Rotation of the type wheels 112 may be brought about by suitable mechanism which is not shown because it forms no part of the invention. Rotation of the type wheel 111 is brought about by rocking the cam follower 108 (Figure II) which moves the attached cord 110 that is wrapped more than halfway around a hub-like shoulder 118 on the type wheel 111 to set up in printing position a type character corresponding to the numerals which are visually exhibited by the unit weight chart plate 61 (Figure II).

A link 119 is adapted to be pulled downwardly when an ordinary printer (not shown) which cooperates with the wheels 111 and 112 is operated. A stirrup 120 is resiliently connected to the upper end of the link 119 by means of a spring 121. The stirrup 120 is pivotally connected to a radially extending arm 122 of a member or bell crank 123 pivotally mounted on a shaft 124 extending between the arms 116. The stirrup 120 is pivotally connected in a hole 125 (Figure VII) in the arm 122 of the bell crank 123 and the shaft 124 is located in a pair of holes 126 in the bell crank 123. Also carried by the shaft 124 are guides 127 one of which is for the cord 110.

The bell crank 123 also includes a pair of arms 128 which are spaced apart by an integrally formed body portion 129 upon which are mounted four spring pawls 130, there being an individual pawl 130 for each of the type wheels. Each of the spring pawls 130 has a notched end 131, a type wheel-centering finger 132, a slot 133, and a bent end 134. Screws 135, one for each of the pawls 130, extend through the body portion 129 of the bell crank 123 and through notches in the notched ends 131 of the pawls and are threaded into an elongated nut 136 which is common to all of the screws. The nut 136 presses all of the notched ends 131 of the pawls 130 against the body portion 129 of the bell crank and holds the pawls in place. Pivotal movement of the pawls 130 about the axes of the screws 135 is limited by means of pins 137 that are mounted on the body portion of the bell crank and that protrude through the slots 133 in the pawls. Only the notched ends 131 of the spring pawls 130 are fixed in place so that the bent ends 134 of the pawls are free resiliently to move back and forth toward or away from the body portion of the bell crank 123, the body portion being recessed beyond the point where the nut 136 holds the pawls 130 to permit such movement.

When the bell crank 123 is rocked toward the type wheels, the fingers 132 on the individual spring pawls 130 engage in certain of a series of notches 138 which extend around approximately one half of the periphery of each of the type wheels. The fingers 132, because of the resiliency of the pawls 130 and because of the manner in which the pawls are mounted, automatically find the bottoms of their respective notches to accommodate notches of various sizes, any finger which happens to find a shallow or small notch being bent back toward the recessed body portion 129 of the bell crank 123. The series of notches on each of the type wheels are accurately positioned with respect to raised printing type 139 which extend around approximately one half of the periphery of each of the type wheels. The fingers 132 on the pawls finally align or center the type wheels in their printing positions, after they have been initially positioned by the cord 110, and prevent movement of the type wheels during the printing operation causing the type wheels to print a straight line of numerals even though the notches 138 are of various sizes and depths. Hence, close tolerance in the forming of the notches 138 in the type wheels is not necessary. The spring 121 is provided to prevent damage by pawls to the wheels when the link 119 overtravels.

The type wheel 111 has a spiral return spring 140 enclosed in a recess in the type wheel with one of its ends connected to its bushing 113 and the other end connected to the type wheel. The spring is provided to resiliently urge the wheel toward its original position to maintain the cord 110 under tension. Thus, the unit weight type wheel position always corresponds with that of the indicia bearing unit weight chart plate 61.

The electrical circuits shown in Figures III and IV may be combined, as illustrated in Figure VIII, to provide isolation between the signal and power circuits to reduce pickup or noise in the signal circuit. That is, instead of mounting the double deck selector switch 16 (Figure I), the unit weight chart plate 61 (Figure II), the cam 107 (Figure II), and the circuit opening selector switch 82 (Figure III) all on the one drive shaft 63 of the stepping switch 64, the switch 16, the chart plate 61, and the cam 107 may be mounted on the drive shaft of an additional and isolated stepping switch. Reference numerals in Figure VIII identify parts which are similar in structure and function to parts identified by similar reference numerals in Figures III and IV.

Referring to Figure VIII, closing an upper limit switch 70b, or a step switch 85b, or a lower limit switch 80b, or a reset switch 87b causes a drive shaft 63b to be stepped around in the manner hereinbefore described in connection with Figure III. A circuit opening selector switch 82b is mounted on the drive shaft 63b in the same way as the selector switch 82 is mounted on the drive shaft 63 (Figure III), however, the drive shaft 63b additionally has mounted thereon only a switch 91b, as indicated schematically in Figure VIII, the double deck selector switch 16 (Figure I), the unit weight chart plate 61 (Figure II), and the cam 107 (Figure II) being mounted on a drive shaft 141 of a second stepping switch 142. One of the advantages of such an arrangement is that it makes possible isolation between the low voltage, sensitive signal circuit which includes the first stepping switch 64b and the high power circuit which includes the second stepping switch 142. Such isolation reduces pickup or noise in the signal circuit.

The switch 91b (Figure VIII) corresponds to the switch 91 (Figure IV), except that the switch 91b includes an automatically positionable contact 90b whereas the switch 91 includes the contact 90 that is adapted to be manually positionable. Current is supplied to the contact 90b through a lead 143 that is connected in circuit with the rectifier 66b. The movable contact 90b is turned by the drive shaft 63b of the stepping switch 64b so that current flows from the contact 90b through any one of four terminals 92b, 93b, 94b and 95b. The terminals 92b, 93b, 94b and 95b are connected by means of leads 96b, 97b, 98b and 99b respectively to brushes 100b, 101b, 102b and 103b respectively which brushes make constant contact with a selector switch 104b, except when a notch 105b in the switch is located opposite to a brush. The selector switch 104b is mounted on the drive shaft 141 of the stepping switch 142 and makes contant contact with a brush 106b connected in circuit with an interrupter switch 77b and a coil 78b of the stepping switch 142. The double deck selector switch 16 (Figure I), the indicia bearing unit weight chart plate 61 (Figure II), and the cam 107 (Figure II) also may be mounted on the drive shaft 141 to rotate as a unit.

In operation, energization of the coil 78b of the stepping switch 142 causes the drive shaft 141 to be stepped ahead in a manner similar to the way in which the drive shaft 63a (Figure IV) is stepped ahead. Current which flows through the coil 78b returns to the other side of the line through a lead 144.

To summarize briefly, a load cell weighing scale embodying the invention includes a network having an output voltage which is a function of load applied to the weighing scale and a continuously automatically adjustable voltage source that supplies a second voltage in opposition to the output voltage of the network and that operates in response to differences between the voltages. Means are provided for increasing the capacity of the weighing scale without decreasing the sensitivity of indication given by its indicator and such means includes a selector switch which may be turned by a stepping switch and that serves to add at least one fixed increment of voltage to said second voltage, whereby the capacity is increased. The stepping switch may be automatically controlled according to the position of the indicator 12 by means of the electrical circuits shown in Figures III and VIII or manually controlled by means of the electrical circuits shown in Figures III, IV and VIII.

Suitable remote signals or auxiliary load indicating mechanism which may comprise the indicia bearing unit weight chart plate 61 for indicating the fixed increment of voltage added to the second voltage in terms of weight also is provided. Both the selector switch and the remote signals are operated by the stepping switch.

Suitable auxiliary load printing mechanism comprising a unit weight type wheel for printing an indication of the increased capacity of the scale as controlled by the selector switch and as visually indicated by the remote signals also is provided. The unit weight printing type wheel is operated by the same stepping switch which drives the selector switch and the remote signals.

The embodiments of the invention herein shown and described are to be regarded as illustrative only, and it is to be understood that the invention is susceptible to variation, modification, and change within the spirit and scope of the subjoined claims.

Having described the invention, I claim:

1. A weighing scale comprising, in combination, transducer means having an output voltage which is a function of load applied to the scale, adjustable means in circuit with the transducer means for supplying a balancing voltage in opposition to the output voltage, servo means in circuit with both of said means for adjusting the adjustable means in a balancing direction in response to differences between voltages, a capacity changing switch in circuit with the adjustable means for adding increments of voltage to the balancing voltage to increase the capacity of the scale, indicating mechanism that has a normal capacity and that has an indicating member coupled to the servo means for indicating the balancing voltage in terms of weight, switch operating means coupled to the servo means, unidirectionally operable electrical stepping means connected to the capacity changing switch for operating the switch, and an operating circuit for the stepping means, said operating circuit including switch means, the switch operating means operating the switch means to complete a circuit to the stepping means whenever the servo means tends to drive the indicating member to a value greater than said normal capacity of the indicating mechanism and whenever the servo means returns the indicating member to zero indication at anytime after the capacity of the scale has been increased beyond said normal capacity, said operating circuit further including time delay means to provide time intervals between repeat operations of the stepping means and switch mechanism that is controlled by the switch means and that is operatively connected to the stepping means by means of a lead which by-passes the time delay means, the switch mechanism completing a circuit to the stepping means whenever the servo means returns the indicating member to zero indication at anytime after the capacity of the scale has been increased beyond said normal capacity whereby said time intervals between repeat operations of the stepping means are avoided to return the capacity changing switch rapidly to its initial position.

2. A weighing scale comprising, in combination, transducer means having an output voltage which is a function of load applied to the scale, adjustable means in circuit with the transducer means for supplying a balancing voltage in opposition to the output voltage, servo means in circuit with both of said means for adjusting the adjustable means in a balancing direction in response to differences between voltages, a capacity changing switch in circuit with the adjustable means for adding increments of voltage to the balancing voltage to increase the capacity of the scale, indicating mechanism that has a normal capacity and that has an indicating member coupled to the servo means for indicating the balancing voltage in terms of weight, switch operating means coupled to the servo means, electrical stepping means connected to the capacity changing switch for operating the switch, and an operating circuit for the stepping means, said operating circuit including switch means, the switch operating means operating the switch means to complete a circuit to the stepping means whenever the servo means tends to drive the indicating member to a value greater than said normal capacity of the indicating mechanism and whenever the servo means returns the indicating member to zero indication at anytime after the capacity of the scale has been increased beyond said normal capacity, said operating circuit further including a condenser which is so located in such circuit that it must be charged before it is possible to complete the circuit to the stepping means to provide time intervals between repeat operations of the stepping means and switch mechanism that is controlled by the switch means and that is operatively connected to the stepping means by means of a lead which by-passes the condenser, the switch mechanism completing a circuit to the stepping means whenever the servo means returns the indicating member to zero indication at anytime after the capacity of the scale has been increased beyond said normal capacity whereby said time intervals between repeat operations of the stepping means are avoided to return the capacity changing switch rapidly to its initial position.

References Cited in the file of this patent

UNITED STATES PATENTS

| | | |
|---|---|---|
| 2,606,943 | Barker | Aug. 12, 1952 |
| 2,637,619 | Stein | May 5, 1953 |
| 2,656,498 | Goodwin | Oct. 20, 1953 |
| 2,661,260 | Salzman | Dec. 1, 1953 |
| 2,812,170 | Kennedy | Nov. 5, 1957 |
| 2,812,172 | Whitcroft et al. | Nov. 5, 1957 |